(12) United States Patent
Goelles et al.

(10) Patent No.: US 7,270,431 B2
(45) Date of Patent: Sep. 18, 2007

(54) ILLUMINATION DEVICE AND ITS USE

(75) Inventors: Michael Goelles, Jena (DE); Ralf Wolleschensky, Apolda (DE); Dieter Graefe, Jena (DE); Matthias Wald, Kunitz (DE)

(73) Assignee: Carl Zeiss Jena GmbH, Jena (DE)

( * ) Notice: Subject to any disclaimer, the term of this patent is extended or adjusted under 35 U.S.C. 154(b) by 148 days.

(21) Appl. No.: 10/967,304

(22) Filed: Oct. 19, 2004

(65) Prior Publication Data

US 2006/0012899 A1    Jan. 19, 2006

(30) Foreign Application Priority Data

Jul. 16, 2004    (DE)    ............... 10 2004 034 953

(51) Int. Cl.
*G02B 5/10*    (2006.01)
*G02B 21/06*    (2006.01)

(52) U.S. Cl. ..................... 359/868; 359/385
(58) Field of Classification Search ........ 359/867–869, 359/385
See application file for complete search history.

(56) References Cited

U.S. PATENT DOCUMENTS

| 4,173,036 | A | * | 10/1979 | Ferguson | ............. 362/259 |
| 4,589,738 | A | | 5/1986 | Ozaki | |
| 4,685,780 | A | * | 8/1987 | Kimura | ............. 359/851 |
| 4,826,299 | A | | 5/1989 | Powell et al. | |
| 4,862,299 | A | | 8/1989 | Hagita | |
| 5,285,320 | A | * | 2/1994 | Hohberg | ............. 359/853 |
| 5,473,475 | A | * | 12/1995 | Sweatt et al. | ............. 359/869 |
| 6,028,306 | A | | 2/2000 | Hayashi | |
| 2004/0031930 | A1 | | 2/2004 | Wolleschensky et al. | |
| 2004/0125441 | A1 | | 7/2004 | Wang et al. | |
| 2006/0066855 | A1 | * | 3/2006 | Boef et al. | ............. 356/401 |

FOREIGN PATENT DOCUMENTS

| DE | 23 60 197 A1 | | 6/1975 |
| FR | 2 849 509 A | | 7/2004 |
| JP | 01180796 A | * | 7/1989 |
| WO | WO88/07695 | | 10/1988 |

OTHER PUBLICATIONS

Pawley, Handbook of Biological Confocal Microscopy, Plenum Press 1994, pp. 461 and 462.

(Continued)

*Primary Examiner*—Alessandro Amari
*Assistant Examiner*—Mark Consilvio
(74) *Attorney, Agent, or Firm*—Jacobson Holman PLLC

(57) ABSTRACT

To provide an illumination beam (5) which is essentially homogeneous in cross-section, in particular for a laser scanning microscope (15), an illumination device is used which provides an original beam which is essentially rotationally symmetric in cross-section and is incident at a converting unit which then transmits the desired illumination beam (5) and which comprises, for this purpose, an aspherical, convex mirror (1) which is more strongly curved in the area of the point of incidence of the original beam (3) than in the areas removed from the point of incidence.

24 Claims, 5 Drawing Sheets

OTHER PUBLICATIONS

Malyak, Two-Mirror Unobscured Optical System for Reshaping the Irradiance Distribution of a Laser Beam, Applied Optics, Optical Society of America, vol. 31, No. 22, Aug. 1, 1992, pp. 4377-4383.

Nemoto et al, Transformation of a Laser Beam Intensity Profile by a Deformable Mirror, Applied Optics, Optical Society of America, vol. 21, No. 3, Feb. 1, 1996, pp. 168-170.

* cited by examiner

ILLUMINATION DEVICE AND ITS USE

BACKGROUND OF THE INVENTION

1. Field of the Invention

The invention relates to an illumination device which provides an illumination beam which is essentially homogeneous in at least one cross-sectional direction, in particular for a laser scanning microscope, where an original beam which is inhomogeneous in cross-section, in particular Gaussian-shaped, is conducted to a converting unit which transmits the illumination beam.

2. Related Art

In many applications an illumination beam expanded in the form of a line is used, for example, for barcode scanners or for laser scanning microscopes sampling in the form of a row. One possibility for obtaining such a beam in the form of a line consists of a fast redirection of the laser beam along a row so that indeed at each point in time only one point of the row is illuminated, but averaged over a certain period of time a row is illuminated. Another approach which is also used in the state of the art to generate illumination beams shaped in the form of a line uses cylinder optics which anisotropically expand a beam bundle in a known manner. Such a cylinder-optical design is described as mirror optics, for example, in U.S. Pat. No. 4,589,738. There a beam is first directed onto a convex mirror not described in more detail and the beams diverging there are focused by means of a cylindrical lens onto a line.

Cylinder optics in principle does not change the beam profile. It merely expands it in a certain direction. A Gaussian-shaped beam, as is customarily transmitted by a laser beam source or a collimator for the light guide fiber bundle, therefore remains, even after treatment with a cylinder optics, Gaussian-shaped in profile, even if the width of the Gaussian shape after the cylinder optics is no longer the same in all direction transverse to the beam propagation. This has as a consequence the fact that the beam intensity varies sharply along a row or line. In applications which are sensitive with respect to this, one is aided by the fact that the beam is first expanded with a cylinder optics, where the expansion is very much greater than the width of the row or line later required and then, by means of screens, edge areas of the row or line in which the intensity of the radiation has dropped off too sharply with respect to the center are masked. Unfortunately, this has poor efficiency with regard to the utilization of the beam intensity originally generated.

U.S. Pat. No. 4,862,299 discloses a lens which expands a laser beam and, in so doing, re-forms the beam profile to be not Gaussian-shaped. In this document the lens is represented in numerous forms in cross-section and it causes an expansion to approximately rectangular beam shape. For application in laser scanning microscopy the approach of U.S. Pat. No. 4,862,299 is, however, unsuitable for chromatic reasons.

SUMMARY OF THE INVENTION

The objective of the invention is thus to extend a microscope of the type stated initially so that there is suitability for laser scanning microscopy.

This objective is realized according to the invention by the fact that the converting unit comprises an aspherical, convex, or concave mirror which, at least in one sectional plane is more strongly curved in the area of the point of incidence of the original beam than in the areas removed from the point of incidence.

The basic principle of beam-forming in the illumination device is therefore based on performing an energy redistribution, at least in one sectional plane, by means of an aspherical mirror and converting an inhomogeneous, in particular Gaussian-distributed profile, so that in the sectional plane there is a substantially homogeneous energy redistribution. If one forms the mirror in two cross-sectional directions according to the invention aspherically, one obtains a homogenization in two sectional planes, therefore a homogenized field. Through the use of an aspherical mirror a large spectral band width for the illumination radiation can be covered, with simultaneously homogeneous illumination. According to the invention it was recognized that the reflecting aspherical surface, which is curved more strongly in one sectional plane in the area of the point of incidence of the original beam than in the areas removed from the point of incidence, a dependence on wave length in focusing and energy distribution is avoided, where at the same time the inventive concept of varying curvature of the aspherical mirror opens the possibility of a great variety of energy distributions. With the illumination device according to the invention Gaussian bundles can, for example, be re-formed in such a manner that in over 80% of the illuminated area the intensity does not fall under 80% of the maximum value. This is an essentially homogeneous distribution in the sense of the invention.

The variant with diaxial aspherical curvature can be used particularly advantageously for the homogenization in an intermediate plane of a wide-field microscope. Also in the case of multi-point scanning microscopes the homogeneous illumination of an intermediate image in front of the element which generates the point cloud (for example, a Nipkow disk) makes possible a uniform illumination of the sample with spatially essentially more uniform beam intensity. Also, the converting unit according to the invention makes possible the illumination of an objective pupil so that a particularly good (highly resolved) imaging is achieved since a homogeneously filled pupil permits the optical resolution to be fully exploited.

A form of embodiment which is particularly simple to manufacture is a mirror which is formed as a wedge and with a rounded top. Such a mirror can be produced in a simple manner from a cuboid and achieves a focal line with a homogeneous energy distribution.

In a variant which is mathematically particularly simple to describe, the mirror is defined by a conical constant as well as the rounding radius of the top and satisfies in (x, y, z)-coordinates with regard to the z-coordinate of the equation $$y^2/[c+(c^2-(1+Q)y^2)^{1/2}],$$

where c is the rounding radius of the top and Q is the conical constant.

In microscopy one would like, for an illumination in the form of a row, to distribute the radiation not only homogeneously along a longitudinal line but rather, in given cases, also to adapt the width of the line at the diameter of the entrance pupil of the following optical system. In order to achieve this, the aspherical mirror must also cause a beam expansion transverse to the direction of the line. This can be achieved in the case of the variant stated initially of a mirror in the form of a wedge with a rounded top particularly simply by the mirror surface, or at least the top, being curved along the longitudinal axis of the top.

The aspherical mirror with a rounded top is therefore then curved two-dimensionally, where in a first sectional direction (perpendicular to the longitudinal axis) a wedge with rounded peak, in a second sectional direction (along the top) a parabolic or spherical curvature can be present. The latter curvature then sets the height of the illuminated field, while, on the contrary, the aspherical form perpendicular to the longitudinal axis causes expansion along the field and due to the asphericity has as a consequence an energy distribution. Along the field of substantially homogeneous energy distribution is thus achieved A mirror curved additionally along the top, e.g., spherically or parabolically, can be captured in a simple mathematical description as follows:

$$f(x,y)=\sqrt{(a(y)-r_x)^2-x^2}-r_x$$

where $r_x$ is the radius of curvature along the top, that is, in the aforementioned second sectional direction.

In order to effect an adaptation for complete illumination of an intermediate image or an entrance pupil of a following optical system in the case of the mirror curved in two directions (for example, in the first sectional direction aspherically, in the second spherically), it is expedient to dispose collecting optics behind the mirror, for example, in the form of a collecting mirror. Customarily, for the generation of a rectangular field therein, one will use a cylindrical or toroidal mirror since thus a rectangular field is obtained, as is desired for most instances of application. For other field forms the mirror form may deviate. Thus, one can, for example, also use the aspherical surfaces according to the invention for this second mirror in order to achieve a combination of homogenization of the pupil filling in a first direction (through one of the aspherical surfaces) and the intermediate image in the remaining direction (through the other aspherical surface). Also, an image error compensation can be effected by the additional aspherical surfaces. Naturally one can assign, in addition, the second aspherical surface to the collecting mirror.

For the form of embodiment of the aspherical mirror with spherical curvature in the second sectional plane it is thus preferred that the collecting mirror in the x-direction has a radius of curvature equal to $r_x+2·d$, where d is the distance between the aspherical mirror and the collecting mirror. The radius of curvature $r_x$ of the aspherical mirror in the second sectional plane then scales directly the height of the illuminated rectangular field or the profile of the illumination beam.

Naturally, a mirror which, according to the invention, is aspherical in both sectional directions can be used for the homogeneous illumination of the pupil. In the case of a rotationally symmetric aspherical surfaces, they then cause a homogeneously illuminated circular field. An image field illuminated homogeneously in this manner can be used for a wide-field illumination of a microscope. Also, it is possible, from the pupil illuminated in such a manner for a scanning process, e.g. multi-point scanners such as Nipkow scanners, to select and use individual areas.

For the illumination of the aspherical mirror it is advantageous to set the axis of symmetry of the mirror at an angle between 4° and 20° to the axis of incidence of the original beam, which is profiled, for example, to be Gaussian-shaped, since then a compact design can be obtained. The collecting mirror disposed behind, which can be formed, for example, cylindrically or toroidally, collects the radiation energy redistributed by the aspherical surfaces and compensates wave aberrations accumulating during the propagation. If such wave aberrations play no role in simple cases, a spherical lens can be used instead of the collecting mirror.

BRIEF DESCRIPTION OF THE DRAWINGS

The invention is explained in more detail in the following, with reference to the drawings, in embodiment examples. Shown in the drawings are.

DETAILED DESCRIPTION OF THE PREFERRED EMBODIMENTS

Figure 1:
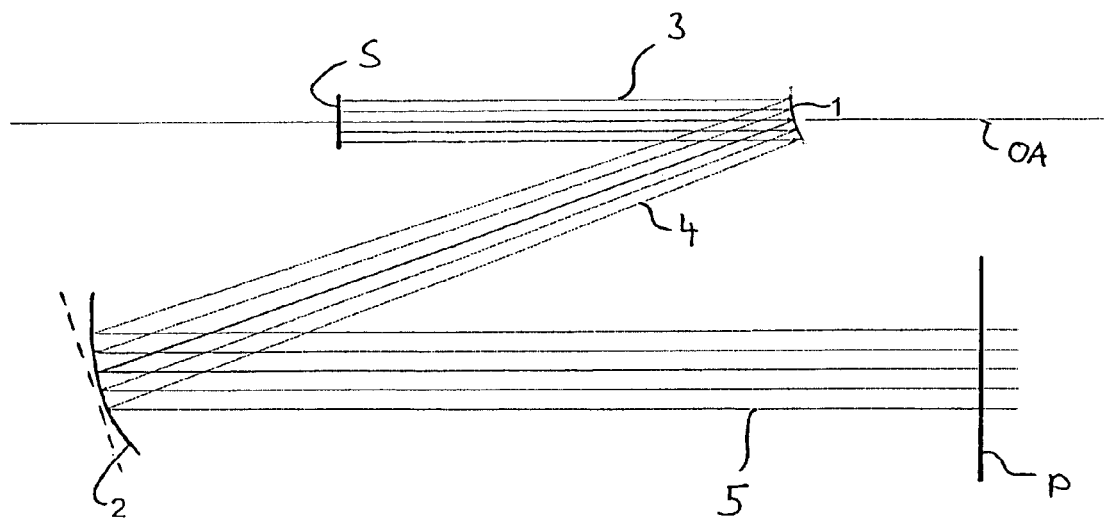
FIG. 1 a schematic representation of the beam path in an illumination device providing Rectangular profiled illumination beam in a first sectional plane, FIG. 2 the beam path in FIG. 1 in a second sectional plane set perpendicular to the first plane, FIG. 3 a computer representation of an aspherical mirror which is used in the beam path of FIGS. 1 and 2, FIG. 4 a sectional plane through an aspherical mirror of FIG. 3 to illustrate the magnitudes characterizing this mirror, FIG. 5 a representation similar to FIG. 4 for mirror only forming beams in one sectional plane, FIG. 6 a representation similar to FIG. 4 for a diaxially aspherical mirror, FIG. 7 an intensity profile achieved with the beam path of FIGS. 1 and 2 in a sectional plane, FIG. 8 a schematic representation of a laser scanning microscope with the illumination arrangement of FIGS. 1 and 2, FIG. 9 a beam path for the homogenization of the illumination of an intermediate image, and FIG. 10 a beam path for the homogenization of the filling of an objective pupil.
Figure 2:
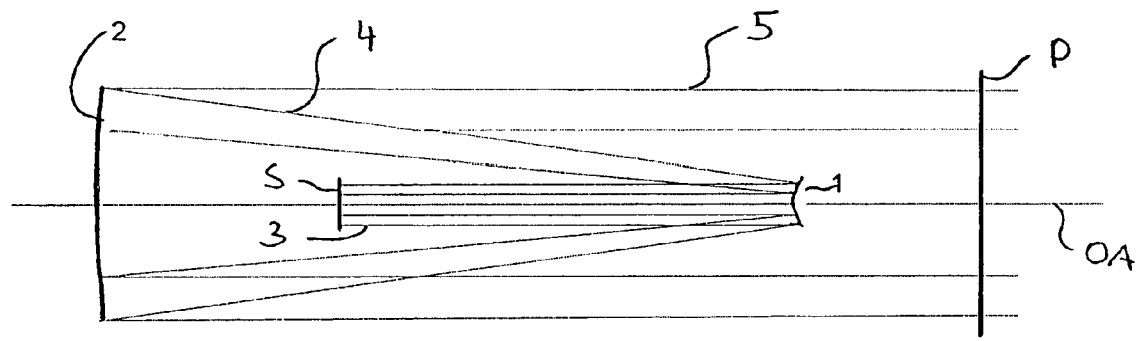

FIGS. 1 and 2 show an illumination arrangement in which radiation from a radiation source S is re-formed with respect to its beam profile. FIG. 1 is a section in a (z, x)-plane. FIG. 2 is a section perpendicular thereto in a (z, y)-plane. The radiation source S transmits a beam which is profiled to be Gaussian-shaped in each sectional direction perpendicular to the direction of propagation. After the re-formation a beam is present in a profile plane P which illuminates essentially a rectangular field, where the intensity distribution is not Gaussian-shaped along the longitudinal field axis but rather chest-shaped.

For beam forming, an aspherical mirror 1 is used which expands the radiation. The expanded radiation is parallelized once more by means of a collecting mirror 2. The aspherical mirror 1 is struck by an original beam 3 from the radiation source S, said beam having said rotationally symmetric Gaussian-shaped beam profile. The aspherical mirror 1 is curved in the section represented in FIG. 1 according to a radius of curvature $r_x$, in this plane therefore spherically. The aspherical component first comes to bear in the section represented in FIG. 2 and still to be explained. Due to the sphericity of the aspherical mirror 1 along the x-axis the diverging beam transmitted from the aspherical mirror 1 is expanded while preserving the Gaussian profile. The collecting mirror 2, which is also spherically in the sectional plane of FIG. 1, provides for a profiled beam 5 which also has a Gaussian profile in the profile plane P in the sectional representation of FIG. 1.

For many applications this expansion is not desired. The aspherical mirror 1 and the collecting mirror 2 are then not curved in the sectional plane represented. The dotted representation of the mirror 2 symbolizes this. Naturally, the beam bundle then does not diverge.

FIG. 2 shows a section perpendicular to the FIG. 1. In this plane the aspherical mirror 1 is formed aspherically and the original beam 3 transmitted from the radiation source S is then converted into a diverging beam 4 in a manner which redistributes energy. The aspherical mirror 1 reflects with increasing angle relative to the optical axis OA increasing beam power so that in the diverging beam 4, seen in the sectional representation of FIG. 2, energy is redistributed. The collecting mirror 2 collects the diverging beam 4, in the sectional representation of FIG. 2 no longer Gaussian-shaped in cross-section, and parallelizes the radiation to form a profiled beam 5. In this plane a non-equidistant distribution of the partial beams drawn in for illustration is thus shown in FIG. 2, in contrast to FIG. 1.

Figure 3:
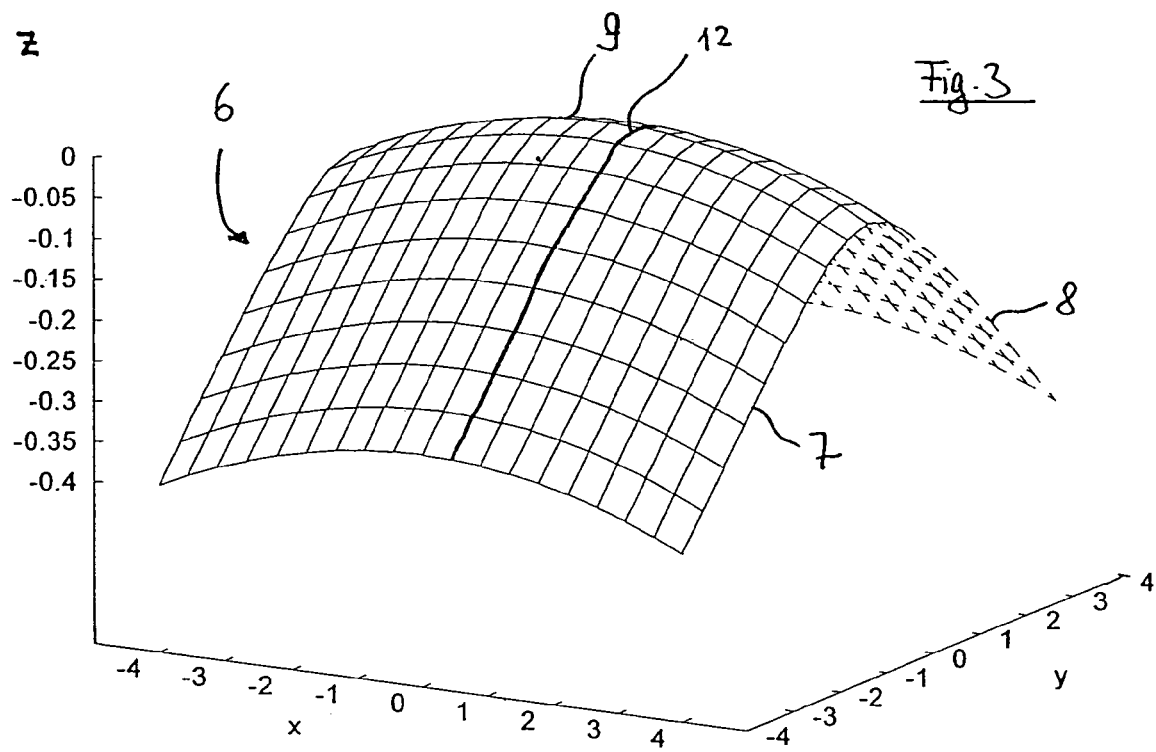

The effect of the aspherical mirror 1 shown in FIGS. 1 and 2 in a convex mode of construction can be seen still better if one observes the mirror surface 6 represented, by way of example, in FIG. 3. The mirror surface 6 comprises two roof surfaces 7, 8 which run together in a top 9. At the same time, the mirror surface 6 is spherically curved along the x-axis, as also becomes clear in the curvature of the top 9. The mirror surface 9 is therefore wedge-like in a (z, y)-section (parallel to the y-axis) with rounded peak. In a section parallel to the x-axis ((z, x)-section) there is, on the contrary, a spherical curvature. In a concave aspherical mirror 1 this applies analogously.

The aspherical curvature in the (z, y)-plane causes the energy redistribution represented in FIG. 2 since, due to the wedge profile rounded only in the area of the peak, increasing energy percentages are also reflected in an increasing angle to the optical axis. The spherical curvature in the (z, x)-plane causes, on the contrary, a profile-preserving expansion of the beam, as is represented in FIG. 1. The original rotationally symmetric Gaussian-shaped profile is thus restructured to form an approximately rectangular profile. In the case of asphericity in both sectional planes the field is homogenized in both sectional planes.

Figure 4:
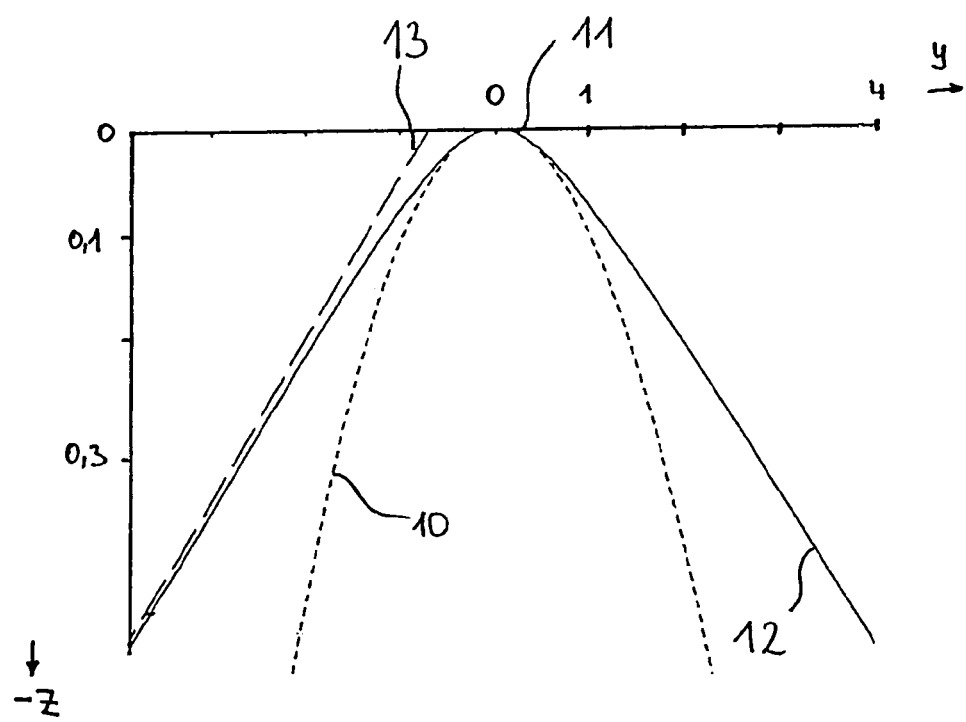

FIG. 4 shows a section line 12 of the mirror surface 6 in a (z, y)-section, that is, in a section along the y-axis. The section line 12 is, for illustration, entered not only in FIG. 4 but rather also as a thicker line in FIG. 3. Its form is essentially determined by two geometric factors, on the one hand, by a parabola 10 which determines the form of the rounded peak of the sectional line 12, and, on the other hand, by an asymptote 13 which defines the curve of the sectional line 13 far from the peak 11. The parabola 10 can be defined by specifying a radius of curvature for the peak. The asymptote 13 is determined by a conical constant Q. For y-values increasing without bound, the sectional line 12 approaches the line $1/(Q*c)=y/(1-(1+Q)^{1/2})$. The conical constant Q therefore determines the slope $1/(1-(1+Q))^{1/2}$ in the outer spherical area. The radius c determines the curvature in the area of the peak 11. In all, the sectional line is thus defined by the equation $$y^2/[c+(c^2-(1+Q)y^2)^{1/2}].$$

The asphericity explained for one sectional direction can naturally also be provided in the other sectional direction. One achieves with this a homogeneous ellipsoidal or circular field, the latter in the case of a rotationally symmetric aspherical mirror 1. Alternatively, the sphericity in the x-direction can be omitted.

The aspherical mirror 1 then has for each x-coordinate the profile of the sectional line 12. The mirror surface represented in FIG. 3 has a radius of curvature c=10 mm, a conical constant Q=−100, and a radius of curvature along the x-axis of $r_x$=100 mm. The parameter $r_x$ is customarily chosen to be very much larger than the diameter of the original beam 3.

Figure 5:
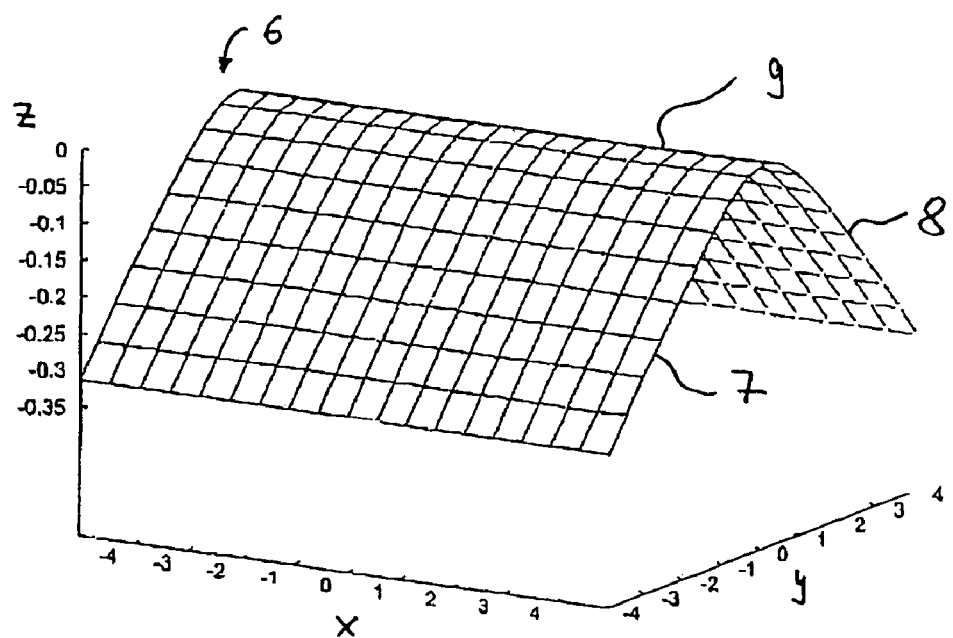
Figure 6:
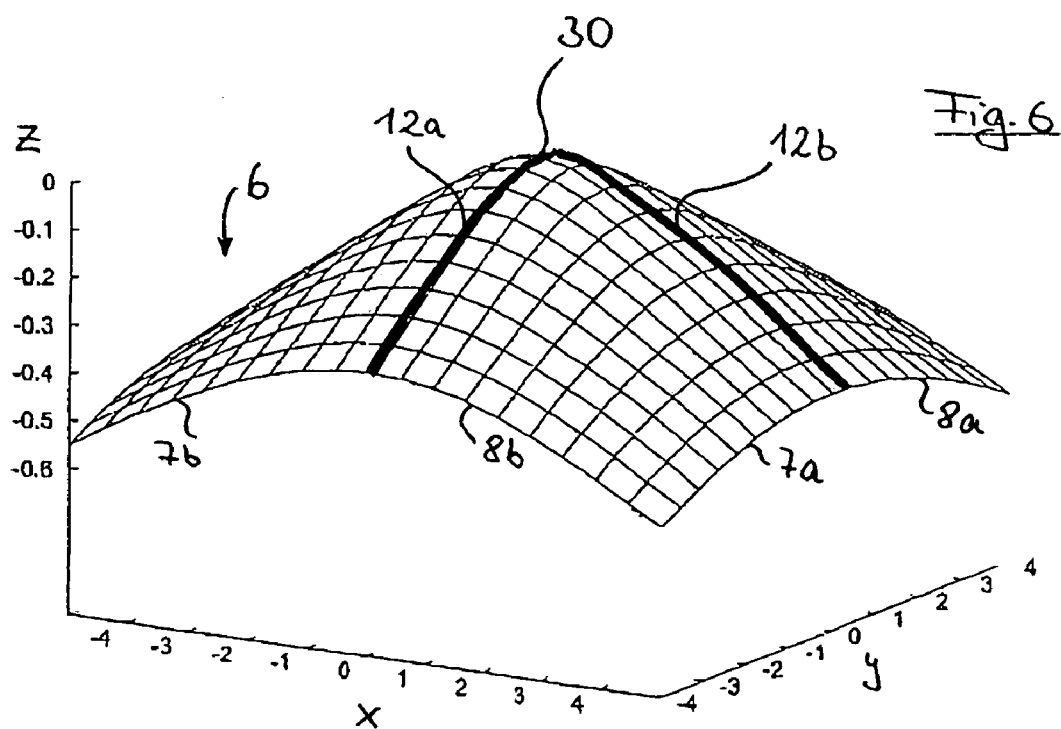

FIGS. 5 and 6 show representations similar to FIG. 3, where the mirror surface 6 of the FIG. 5, however, is merely curved along the y-axis and has no curvature along the x-axis. The mirror surface 6 has a roof form with a round top 9. With this mirror surface 6 the uniform expansion of the beam represented in FIG. 1 disappears in the (z, x)-plane. The diverging beam 4 drawn in FIG. 1 then corresponds, with the use of the mode of construction according to FIG. 5, in this plane to the original beam 3.

In the mode of construction shown in FIG. 6 the mirror surface 6 is, on the contrary, not only curved aspherically along the y-axis but rather also along the x-axis. Instead of the roof surfaces 7, 8 of FIG. 3, roof surfaces 7a, 8a are thus present in the (z, y)-plane as well as 7b, 8b in the (z, x)-plane, where these roof surfaces are each aspherically curved roof surfaces in said sectional planes. The mirror surface 6 of FIG. 6 thus has not only one sectional line 12, but rather two sectional lines 12a, 12b, each of which satisfy the connection described with the aid of FIG. 4 and are described by the same equations. If the converted beam should, with the aid of the aspherical mirror 1, have rotationally symmetric cross-section, the mirror surface 6 is to be chosen to be rotationally symmetric relative to the peak 30, which in FIG. 6 is drawn in as a point of intersection of the sectional lines 12a, 12b. If one configures the mirror surface 6 with sectional lines 12a, 12b, in which different conical constants Q or radii of curvature are chosen, one achieves an elliptical beam cross-section.

Figure 7:
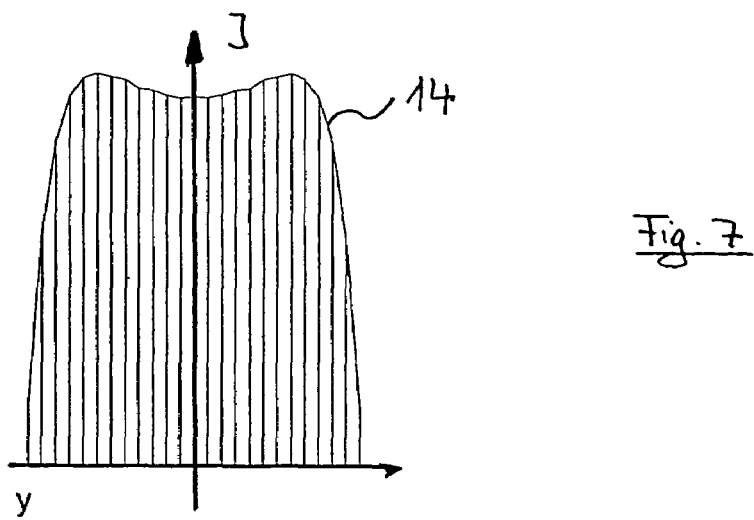

The mirror surface 6=s profile represented in FIGS. 3, 5, and 6 in the (z, y)-plane causes the approximately uniform distribution of the intensity I represented as profile 14 in FIG. 7 in the profile plane P, where the representation of FIG. 7 shows the profile 14 along the y-axis. As is to be seen, the radiation intensity lies in 80% of the illuminated area at over 80% of the maximum value. The profile 14 is approximately chest-like, in any case very much nearer a rectangle than the Gaussian profile originally present. In the aforementioned rotationally symmetric variant the profile 14 applies for any sectional plane, the ordinate then exhibits the radius of the field.

The mirror surface 6 of the aspherical mirror 1 can be manufactured in the most varied ways. Thus, in a cylinder which has a radius of curvature which corresponds to the radius of curvature $r_x$ of the mirror surface in the (z, x)-plane, the profile corresponding to the sectional line 12 can be incorporated. If one wants the mirror surface 6 of FIG. 5 which is not curved in the (z, x)-plane, that is, its radius of curvature in this sectional plane can be assumed to be infinite, the processing can be done on a cuboid or wedge which is then rounded in the area of the top corresponding to the curvature c predefined by the parabola 10. Basically, and particularly for $r_x$ radii less than 0 and in the mode of construction according to FIG. 6, re-formation techniques, in particular such as replica techniques with multiple re-formation, can be used to form the mirror surface 6 of the aspherical mirror 1.

To generate the profiled beam 5, a collecting mirror 2 is disposed behind the aspherical mirror 1, as shown in FIGS. 1 and 2. This is, for example, formed as a toroidal mirror with radii of curvature $r_{fx}$, $r_{fy}$ and parallelizes the diverging beam 4. In so doing, the diverging beam 4 runs out limited by the spherical curvature (in the (z, x)-plane) of the aspherical mirror 1 as well as limited by the aspherical profile according to the sectional line 12. For collimation of the diverging beam 4 the collecting mirror 2 is thus formed as a toroidal mirror with different radii of curvature $r_{fx}$, and $r_{fy}$. The former divergence sets the height of the rectangular field to be illuminated by the profiled beam 5, the latter divergence causes the expansion along the longer extension.

In order to be able to perform the setting of the height of the rectangular field to be illuminated particularly simply, for the toroidal mirror, the radius $r_{tx}$ is chosen to be $r_{tx}+2 \cdot d$, where d describes the distance between the aspherical mirror 1 and the collecting mirror 2 on the optical axis. One then obtains a beam expansion factor of $r_{tx}/r_x$ and thus approximately $1+2d/r_x$.

Instead of the collecting mirror 2 a corresponding achromatic toroidal lens can naturally also be used. Furthermore, to eliminate the changed bundle diameter transverse to the homogenized direction, at least one cylinder mirror can be used which is dimensioned so that it together with the radius $r_x$ of the aspherical mirror 1 as well as the radius $r_{tx}$ of the collecting mirror 2 selectively changes the focusing and the bundle diameter transverse to the homogenized direction. This cylinder mirror can be disposed before the aspherical mirror 1 or after the toroidal collecting mirror 2. Its function can also be achieved by at least one achromatic cylinder lens.

Figure 8:
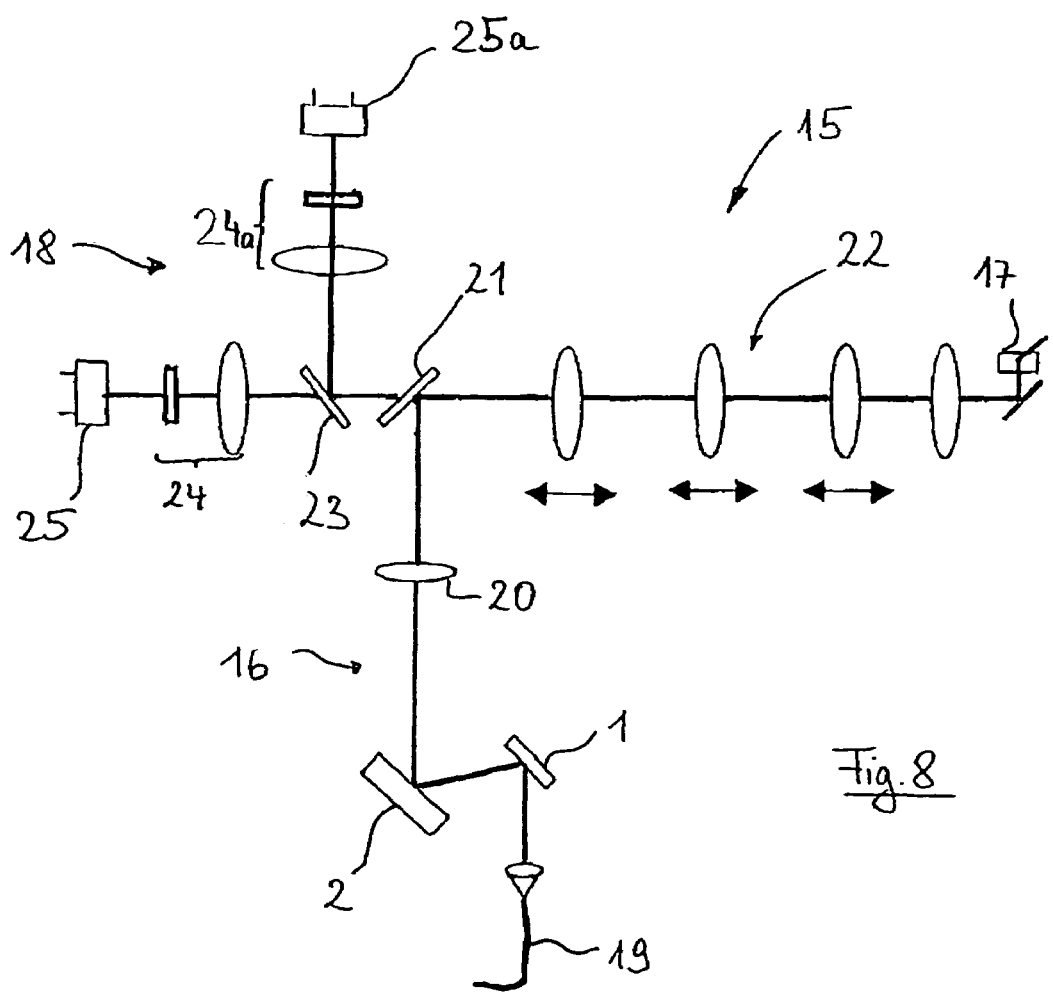

FIG. 8 shows an exemplary use of the illumination arrangement in a laser scanning microscope 15 or in its illumination unit 16. Therein the radiation onto the illumination unit 16 is redirected via a scanning head 17 as a row over a (not represented) sample and is analyzed in a detector unit 18 which is implemented in the form of embodiment of FIG. 6 to have multiple spectral channels.

In detail, from a light guide fiber 19, a beam is decoupled whose Gaussian-shaped profile is re-formed via the described combination of the aspherical mirror 1 and the collecting mirror 2 into a beam which is essentially rectangular in cross-section. The aspherical mirror 1 is implemented to be aspherical in one sectional plane, spherical in the other. By means of illumination optics 20 the beam is conducted via a principal color splitter 21 and zoom optics 22 to the scanning head 17. There the illumination row provided in this manner is redirected transverse to the row axis over a sample. Fluorescence radiation generated on the sample in the illuminated area reaches via the scanning head 17 and the zoom optics 22 back to the principal color splitter and is transmitted there based on its spectral composition different from the illumination radiation. A secondary color splitter 23 disposed behind splits the fluorescence radiation into two spectral channels, each of which comprises a pinhole objective 24, 24a which redirects the radiation onto a CCD row 25, 25a. Each pinhole objective causes in a confocal detection the selection of the depth range from which fluorescence radiation can reach the CCD row. It comprises a suitable optics with slit diaphragm which lies confocally to the focal line on the sample.

The use of the illumination beam bundle in the form of a line provided by means of the illumination optics makes possible a highly parallel data acquisition since, unlike in the case of a customary point-sampling laser scanning microscope, several sample points are imaged simultaneously confocally, or at least partially confocally, onto the CCD rows 25, 25a. In comparison to a confocal point scanner, for the same image acquisition time, the same image dimensions, the same field of view, and the same laser power per pixel, a signal/noise ratio is realized which is improved by a factor of $\sqrt{n}$, where n denotes the number of pixels in the CCD row. A typical value for this number lies between 500 and 2,000. As a prerequisite for this, the illumination in the form of rows which is provided by the illumination unit 16, has power n times that of the laser focus of a confocal point scanner.

Alternatively, the intensity of the radiation introduced on the sample can, in comparison to confocal point scanners with the same image acquisition time and the same signal/noise ratio, be reduced by a factor n if the laser power otherwise used as in customary point-scanning microscopes is distributed onto the entire field illuminated by the illumination unit 16.

The combination of a line-sampling laser scanning microscope together with the illumination unit 16 therefore makes it possible, in comparison to the confocal point scanners to image, with laser scanning microscopy, weak-intensity signals of sensitive sample substances with the same surface signal/noise ratio and the same sample load faster by a factor of n, with the same image acquisition time, with a signal/noise ratio improved by a factor of $\sqrt{n}$, or with the same image acquisition time, with the same signal/noise ratio with a sample load lower by a factor of n. These advantages can, however, only be achieved with the illumination unit 16 by the use of the aspherical mirror 1 in its full extent.

Figure 9:
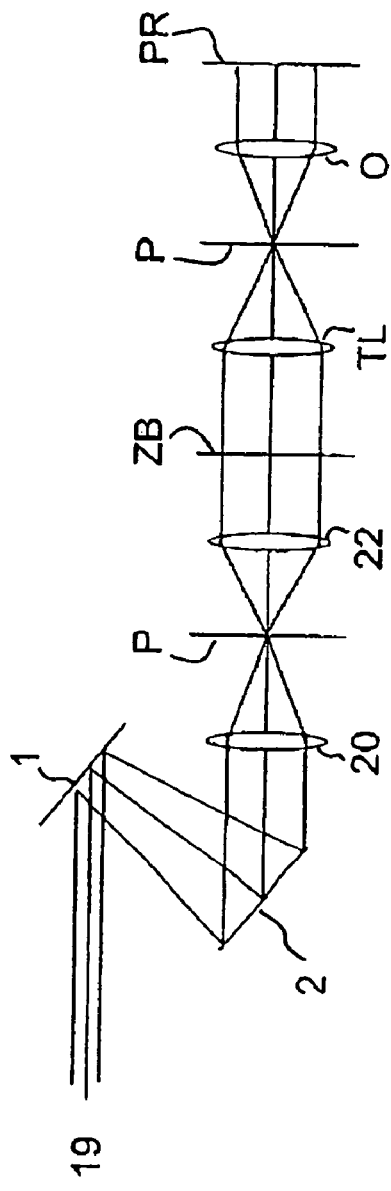
Figure 10:
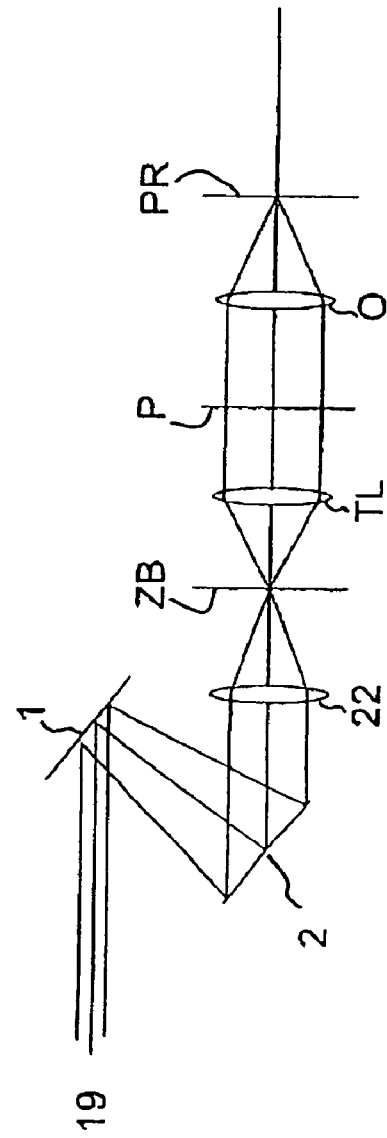

FIGS. 9 and 10 show two possibilities of how a homogeneous illumination can be used with the aid of the converting unit. FIG. 9 shows the use of the aspherical mirror 1 with a collecting mirror 2 disposed behind for the homogeneous filling of an intermediate image ZB which lies between the zoom optics 22 and a tubular lens TL disposed behind with following objective O. This optics TL, O disposed behind images the homogeneously illuminated intermediate image onto a sample PR so that a homogeneous wide-field illumination is achieved, FIG. 9 shows that the described converting unit is advantageous as homogenization means in a light microscope or in a parallel scanning microscope system, for example, with a Nipkow scanner or a multi-point scanner.

Here reference is made to multi-point or Nipkow arrangements in U.S. Pat. No. 6,028,306, WO 88 07695, or DE 2360197 A1, which are incorporated into the disclosure.

Also included are resonance scanner arrangements, as are described in Pawley, Handbook of Biological Confocal Microscopy, Plenum Press 1994, page 461 ff.

FIG. 10 shows an alternative use in which the converting unit serves for uniform filling of the pupil P between tubular lens TL and objective O. With this, the optical resolution of the objective O can be fully exploited. This variant is expedient in a point-scanning microscope system or in a line-scanning system (in the latter in addition to the axis in which focusing into or onto the sample occurs).

The illumination device according to the present invention as described above can be used for the study of development processes, in particular dynamic processes in the tenth of a second up to 1 hour range, in particular at the level of united cell structures and entire organisms, in particular according to at least one of the following points:

- analysis of living cells in a three-dimensional environment whose neighboring cells react sensitively to laser illumination and which must be protected from the illumination of the three-dimensional-ROI,
- analysis of living cells in a three-dimensional environment with markings which are intended to be selectively bleached by laser illumination in three dimensions, for example, FRET experiments,
- analysis of living cells in a three-dimensional environment which are intended to be selectively bleached by laser illumination in three dimensions and are also intended to be observed simultaneously outside of the ROI, for example, FRAP and FLIP experiments in three dimensions, selective analysis of living cells in a three-dimensional environment with markings and drugs which exhibit the manipulation-related changes by laser illumination, for example, activation of transmitters in three dimensions, selective analysis of living cells in a three-dimensional environment with markings which exhibit the manipulation-related color changes by laser illumination, for example, paGFP, Kaede, selective analysis of living cells in a three-dimensional environment with very weak markings which, for example, require an optimal balance of confocality against detection sensitivity, living cells in a three-dimensional united tissue structure with varying multiple markings, for example, CFP, GFP, YFP, DsRed, HcRed, among others, living cells in a three-dimensional united tissue structure with markings which exhibit color changes related to function, for example, Ca+ markers, living cells in a three-dimensional united tissue structure with markings which exhibit color changes related to development, for example, transgenic animals with GFP, living cells in a three-dimensional united tissue structure with markings which exhibit manipulation-related color changes by laser illumination, for example, paGFP, Kaede, living cells in a three-dimensional united tissue structure with very weak markings which require a restriction of confocality to promote detection sensitivity, and fast signal transmission processes, in particular neurophysiological processes with high temporal resolution since the activities mediated by ions play out in the range of hundredths up to less than thousands of a second, in particular in studies in the muscle or nerve system.

The above-described arrangements and/or processes can be used for at least one of:

the study of internal cellular transport processes, in particular for the representation of small motile structures, e.g. proteins, with high speed (usually in the range of hundredths of a second), in particular for application such as FRAP with ROI bleaches, and the representation of molecular and other subcellular interactions, in particular the representation of very small structures with high speed, preferably with the use of indirect techniques such as, for example, FRET with ROI bleaching for the resolution of submolecular structures.

The invention claimed is:

1. An illumination device for use in a laser scanning microscope to provide a profiled illumination beam that is essentially homogeneous in at least one cross-sectional direction, the illuminating device comprising:

means for transmitting an original beam which is inhomogeneous in cross-section and which has a point of incidence, and a mirror for expanding the original beam, the mirror being more strongly curved in the area of the point of incidence of the original beam than in the areas removed from the point of incidence to provide a profiled illumination beam that is essentially homogeneous in at least one cross-sectional direction, wherein the surface of the mirror has a top and the surface satisfies in Cartesian (x, y, z)-coordinates $y^2/[c+(c^2-(1+Q)y^2)^{1/2}]$, where c is a radius of curvature of the top and Q is the conical constant, and wherein the mirror satisfies the equation $f(x,y)=\sqrt{(a(y)-r_x)^2-x^2}-r_x$, where $r_x$ is the radius of curvature along the longitudinal axis of the top and a(y) is the function of $y^2/[c+(c^2-(1+Q)y^2)^{1/2}]$.

2. The illumination device according to claim 1 wherein the inhomogeneneous cross-section is Gaussian-shaped.

3. The illumination device according to claim 1, wherein the mirror has an axis of symmetry that lies at an angle between 4° and 20° to the axis of incidence (OA) of the original beam.

4. The illumination device according to claim 1, wherein the mirror is one of an aspherical mirror, a convex mirror, and a concave mirror.

5. The illumination device according to claim 4, wherein the mirror is an aspherical mirror and is formed as a wedge and with a rounded top.

6. The illumination device according to claim 5, wherein the surface of the mirror is curved in addition along the longitudinal axis of the top.

7. The illumination device according to claim 4, wherein the mirror is an aspherical mirror and a second mirror is disposed behind the aspherical mirror.

8. The illumination device according to claim 7, wherein the second mirror is one of cylindrical and toroidal.

9. The illumination device according to claim 7, wherein the second mirror in the x-direction has a radius of curvature equal to $(r_x+2\cdot d)$, where d is the distance between the aspherical mirror and the second mirror.

10. Use of the illumination device of claim 1 for at least one of:

studying dynamic processes in the range of a tenth of a second up to 1 hour range, at the level of united cell structures and entire organisms;

representing small motile structures with high speed;

representing very small structures with high speed for the resolution of submolecular structures; and studying neurophysiological processes with high temporal resolution within muscle or nerve systems.

11. Use of the illumination device according to claim 10, wherein the very small structures are represented using FRET with region of interest bleaching.

12. A laser scanning microscope comprising:

means for transmitting an original beam which is inhomogeneous in cross-section and which has a point of incidence, and a mirror for expanding the original beam, the mirror being more strongly curved in the area of the point of incidence of the original beam than in the areas removed from the point of incidence to provide a profiled illumination beam that is essentially homogeneous in at least one cross-sectional direction, wherein the surface of the mirror has a top and the surface satisfies in Cartesian (x, y, z)-coordinates $y^2/[c+(c^2-(1+Q)y^2)^{1/2}]$, where c is a radius of curvature of the top and Q is the conical constant, and wherein the mirror satisfies the equation $f(x,y)=\sqrt{(a(y)-r_x)^2-x^2}-r_x$, where $r_x$ is the radius of curvature along the longitudinal axis of the top and a(y) is the function of $y^2/[c+(c^2-(1+Q)y^2)^{1/2}]$.

13. The laser scanning microscope according to claim 12, wherein the microscope has sampling in the form of a line.

14. An illumination device for use in a laser scanning microscope with sampling in the form of a line, comprising:

means for transmitting an original beam which is inhomogeneous in cross-section, and a mirror for expanding the original beam, the mirror being more strongly curved in the area of the point of incidence of the original beam than in the areas removed from the point of incidence to provide a profiled illumination beam that is essentially homogeneous in at least one cross-sectional direction, wherein the surface of the mirror has a top and the surface satisfies in Cartesian (x, y, z)-coordinates $y^2/[c+(c^2-(1+Q)y^2)^{1/2}]$, where c is a radius of curvature of the top and Q is the conical constant, and wherein the mirror satisfies the equation $f(x,y)= \overline{\sqrt{(a(y)-r_x)^2-x^2}-r_x}$, where $r_x$ is the radius of curvature along the longitudinal axis of the top and a(y) is the function of $y^2/[c+(c^2-(1+Q)y^2)^{1/2}]$.

15. The illumination device according to claim 14, wherein the inhomogeneneous cross-section is Gaussian-shaped.

16. The illumination device according to claim 14, wherein the mirror has an axis of symmetry that lies at an angle between 4° and 20° to the axis of incidence (OA) of the original beam.

17. Use of the illumination device of claim 14 for at least one of:
studying dynamic processes in the range of a tenth of a second up to 1 hour range, at the level of united cell structures and entire organisms;
representing small motile structures with high speed;
representing very small structures with high speed for the resolution of submolecular structures; and
studying neurophysiological processes with high temporal resolution within muscle or nerve systems.

18. Process for studying internal cellular transport processes, comprising the steps of:
utilizing the illumination device of claim 14 to represent small motile structures with high speed.

19. The illumination device according to claim 14, wherein the mirror is one of an aspherical mirror, a convex mirror, and a concave mirror.

20. The illumination device according to claim 19, wherein the mirror is an aspherical mirror and is formed as a wedge and with a rounded top.

21. The illumination device according to claim 20, wherein the surface of the mirror is curved in addition along the longitudinal axis of the top.

22. The illumination device according to claim 19, wherein the mirror is an aspherical mirror and a second mirror is disposed behind the aspherical mirror.

23. The illumination device according to claim 22, wherein the second mirror is one of cylindrical and toroidal.

24. The illumination device according to claim 22, wherein the second mirror in the x-direction has a radius of curvature equal to $(r_x+2\cdot d)$, where d is the distance between the aspherical mirror and the second mirror.

* * * * *